Oct. 4, 1955 O. DOEHLER 2,719,914
RADIO RELAY SYSTEM COMPRISING A TRAVELLING WAVE TUBE
Filed May 18, 1949 2 Sheets-Sheet 1
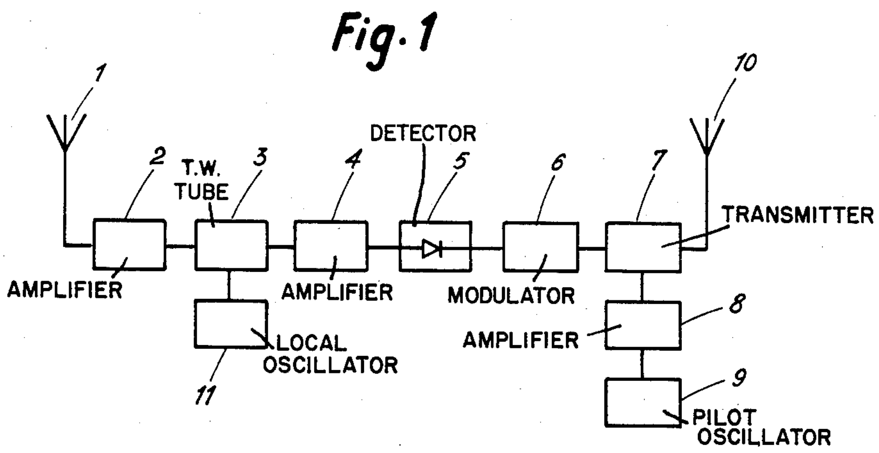
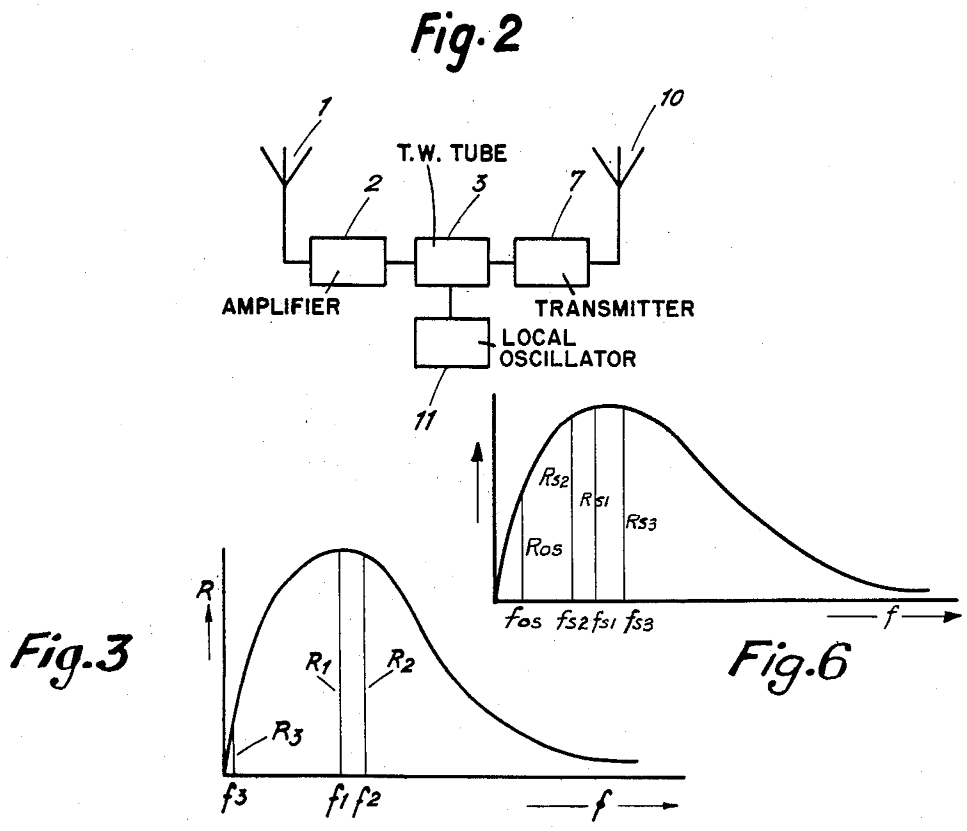
INVENTOR:
OSKAR DOEHLER
By: Haseltine, Lake & Co.
AGENTS

RADIO RELAY SYSTEM COMPRISING A TRAVELLING WAVE TUBE

Filed May 18, 1949 2 Sheets-Sheet 2

INVENTOR:
OSKAR DOEHLER
By: Hazeltine, Lake & Co.
AGENTS 2,719,914
Patented Oct. 4, 1955

2,719,914

RADIO RELAY SYSTEM COMPRISING A TRAVELLING WAVE TUBE

Oskar Doehler, Paris, France, assignor to Compagnie Generale de Telegraphie Sans Fil, a corporation of France Application May 18, 1949, Serial No. 94,018

Claims priority, application France May 28, 1948

7 Claims. (Cl. 250—15)

My invention relates to a device that can be used for example in a multiplex relay station, in a television relay station, or the like, and in any case in which, in order to prevent mutual interference between waves emitted by different stations, it is necessary to provide a separate receiving carrier frequency and a separate transmitting carrier frequency for each of said stations, the two frequencies differing very slightly from one another. Hereinafter, the terms shifting of the frequency will be used to designate a transposition of the carrier frequency in the band for the purposes hereinbefore mentioned or for like purposes, the difference between the initial frequency and the frequency obtained after transposition being in general small. In the present state of the art, the method used comprises, after receiving and amplifying the carrier wave at the frequency $f_{s1}$, mixing it with a wave of a frequency of the same order of magnitude so as to obtain an intermediate frequency wave which is relatively small as compared to the carrier frequency and which is amplified and detected. The low frequency signal obtained, after amplification, modulates by means of an additional modulator a wave of the frequency $f_{s2}$ which differs slightly from $f_{s1}$, and is then radiated into space.

This device, which is complicated per se, becomes more difficult to construct as it is desired to obtain a wider and wider modulation band-pass. In the field of metric, decimetric and centimetric waves it has not heretofore been possible to construct for example an intermediate frequency amplifier having a band-pass width exceeding 50 megacycles. Now, the modern technique already requires an intermediate frequency amplifier that will allow several hundred megacycles to pass.

My invention provides a method which enables the frequency to be shifted and directly radiated without demodulation and intermediate modulation. According to this method, the mixing is obtained by interaction between the incoming signal and the electron stream in a travelling wave tube. The stream is modulated at the cadence of a local oscillator, the frequency of which is very low as compared to the incoming frequency and the frequency shift produced by the mixing is so chosen that the output frequency obtained is fairly close to the input frequency but falls outside the band-pass of the signal. Owing to the fact that the transmission conditions of the output frequency are thus comparable to the transmission conditions of the input frequency, for which conditions the travelling wave tube has been suitable designed, the output frequency has an electric vector of sufficient intensity to enable the output power transferred by the electromagnetic field of that frequency to be, according to the invention, picked up by means of a guide or of a line coupled to the field of that wave.

If, on the other hand, the local frequency which is much lower, encounters much weaker conditions of interaction, it is always possible to compensate for this weakness either by giving sufficient power to the local generator, or by causing said generator to act through suitable means which are adapted to amplify the effect thereof.

Finally, the condition has therefore been obtained that the power of the incoming signal and the power supplied by the local oscillator participate in a substantially equal manner in the transfer of the power inside the retardation line. The device according to the invention therefore makes it possible to solve the problem of obtaining a high mixing gain at the same time as a wide band-pass, in a simple system that produces a small frequency shift.

In order to make the nature of my invention more clearly understood, reference will be had to the accompanying drawings which illustrate the ensuing description and in which:

Fig. 1 is a diagram of the usual system heretofore used.

Fig. 2 is a simplified general arrangement diagram of the device according to the invention, which is intended to show by comparison with Fig. 1 the simplification provided in the previous method by the application of the invention.

Fig. 3 shows the law of variation of the coupling resistance provided by the tube, as a function of the frequency.

Figure 4:
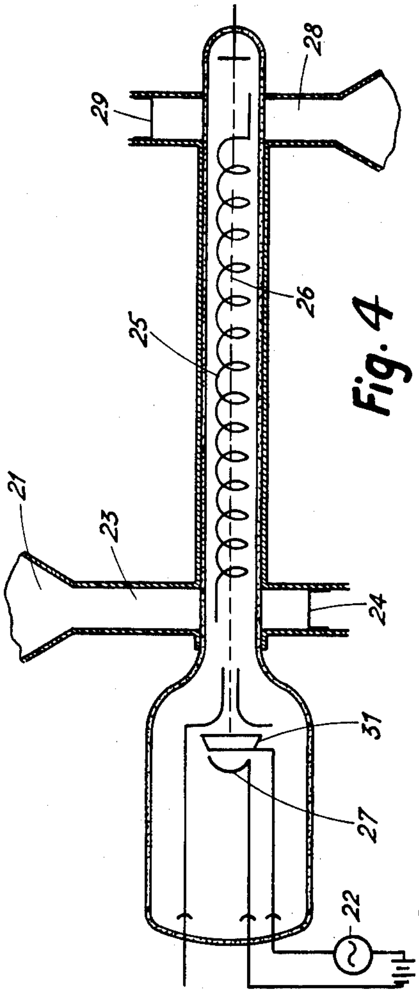
Fig. 4 shows a first embodiment of a device according to the invention.

In Fig. 6, the curve of the coupling resistance is shown as a function of the frequency, of a retardation line constructed in a suitable manner for the application of this method of frequency shifting.

The usual arrangement shown in Fig. 1 has a receiving antenna 1. The radio-frequency signals received by said antenna are of frequencies comprised in the band $f_{s1} \pm \Delta f$, $f_{s1}$ being the carrier frequency and $\pm \Delta f$ the low frequencies that form its side bands. The radio-frequency signals received by 1 are amplified at 2 and converted into intermediate frequency $f_m = f_0 - f_{s1} \pm \Delta f$ by means of the mixing stage formed by the detector 3 and the local oscillator 11 that produces a signal of frequency $f_0$. The intermediate frequency signals obtained are then amplified at 4 and detected at 5 so as to obtain the low-frequency signals within the band $\pm \Delta f$. In order to enable these signals to be transmitted by means of the antenna 10 at a frequency $f_{s2}$ which is different from the frequency $f_{s1}$ at which they were received, they are made to modulate by means of a stage 6, the output stage 7 of a transmitter operating on the frequency $f_{s2}$ which is supplied by its pilot-oscillator 9 and which is amplified by the stage 8. The application of the device according to the invention, such as it will be described with reference to Figs. 3, 4 and 5 makes it possible to reduce considerably the number of component members of the usual devices such as the one hereinbefore described. Fig. 2 shows the arrangement of the component members of a relay station provided with the device according to the invention. In order to enable this diagram to be compared more readily with that of Fig. 1, the same members are designated by the same reference numerals.

1 and 10 are respectively the receiving and the transmitting antennae, 2 is the input radio-frequency amplifier, 11 the local oscillator, 3 the travelling wave tube operating as a frequency-changer according to the invention, 7 is the output amplifying stage.

It can be seen by comparing Figs. 1 and 2 that this device is much simpler.

As already mentioned, the frequency shifting effect is produced by means of a so-called travelling wave thermionic tube. The operation of tubes of this type is based on the interaction between an electron stream and electromagnetic waves, said waves being retarded relatively to the speed of light by means of a retardation line and having an electric vector in the direction of the electron stream. The retardation line is in general formed by a helix. The electron stream travels along the axis of said helix at a speed nearly equal to that of the wave. The power of the signal and also the power supplied by the local oscillator, which are fed to the tube in the manner that will be described hereinafter, are to participate in the transfer of the energy inside the retardation line. In order to enable the idea of the invention to be clearly understood, it is necessary to explain the expression "participate in the transfer of the energy": If an alternating current power of value P is fed to the input of a retardation line, only a wave having an electric vector of sufficiently high value given by the equation: $E=\sqrt{2PR}$ reacts on the electron stream in a reciprocal manner. In this formula R, which is called coupling resistance, has as a function of the frequency, the curve shown in the accompanying Fig. 3. In this figure, the values $R_1$ and $R_2$ which the coupling resistance has for the power applied at the frequencies $f_1$ and $f_2$ are substantially equal; it can therefore be said that the waves that have these frequencies substantially participate in the reciprocal action on the stream. This will not be so in the case of a wave of the frequency $f_3$ which will produce a coupling resistance $R_3$. Such a wave does not participate in the exchange of energy or only participates if its applied power is much greater than that of the other two waves of frequency $f_1$ and $f_2$.

According to the general principle of the invention, it is only necessary for electric fields to be sufficiently intense inside the tube, for the wave of the incoming signal on the one hand, and the output frequency wave on the other hand, and that a signal at the frequency of a local oscillator be introduced into the tube by means of an additional circuit.

Such a device, which is given by way of a non-limitative example and which forms a first embodiment of the invention, is shown in Fig. 4. The cathode current is density modulated by an external oscillator 22 that acts on a control grid or a Wehnelt's cylinder 31. The electronic current thus produced in the retardation line 25 contains an alternating current component at the frequency $f_{0s}$ of the local oscillator. The power of the signal of frequency $f_{s1}$, obtained from an antenna 21, is fed to the input of the retardation line by means of a guide (or of a line 23) adapted to be tuned by means of the piston 24. Inside the retardation line, the reciprocal action of these two frequencies with the electron stream 26 produces currents of the frequency: $f_{s2}=f_{s1}\pm f_{0s}$. Since the coupling resistance offered by the retardation line to the output frequency is sufficiently high owing to the small difference between $f_{s2}$ and $f_{s1}$, an axial electric field of that frequency is set up and participates in the exchange between the electron stream and the guided waves. Owing to the existence of this output frequency wave, it is possible to collect the changed frequency power at the output of the tube by means of a guide (or of a coaxial line) 28 which is adapted to be tuned by means of the piston 29 and is coupled to the electromagnetic fields of the retardation line of the tube.

Figure 5:
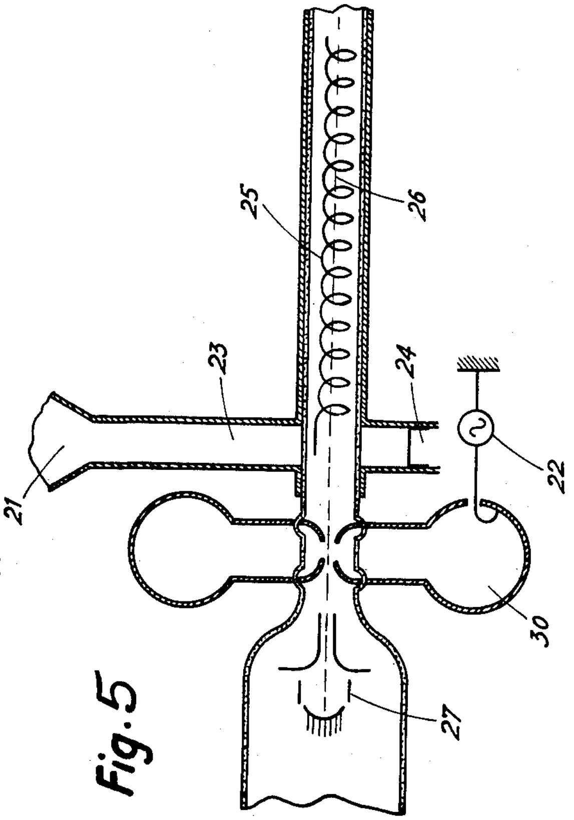
Fig. 5 shows a second embodiment thereof.

Another arrangement, which has the same advantages as the device of Fig. 4 and which forms a second embodiment of the invention, is shown in Fig. 5. The electronic current that flows through the retardation line is no longer density modulated as in the arrangement of Fig. 4, but is velocity modulated. This velocity modulation is obtained by means of a cavity 30 interposed between the cathode 27 and the input of the retardation line 25 which, in this case, is again formed by a helix. The local oscillator 22 is coupled to said cavity 30. By the superposition of the frequencies obtained on the one hand from the local oscillator, and on the other hand from the signal, an electronic current and an electric field at the output frequency are produced inside the retardation line. As in the arrangement of Fig. 4, the power at the changed frequency is collected at the output of the retardation line by means of a wave guide (or a coaxial line) not shown. In this latter arrangement, as moreover in those shown in Fig. 4 the output frequency is chosen higher than the frequency of the signal and the output guide has a critical frequency above the frequency of the signal, but below the output frequency. The radiation of the received signal at the output of the tube is thus prevented.

The arrangement of Fig. 4 and that of Fig. 5 in fact only differ by the manner of introducing the signal obtained from the local oscillator; in one, the introduction produces a modulation of the density, and in the other a modulation of the velocity of the electronic current before it enters the retardation line. It is to be understood that the invention is not limited to these embodiments. Any other similar arrangements that in one way or another involve the use, at the input of the retardation line of a travelling wave tube, of the frequency of the received signal and the frequency obtained from the local oscillator, these frequencies being chosen according to the rules indicated so as to cause them to react in a reciprocal manner with the electron stream, and at the output of said retardation line, of an electromagnetic coupling device that enables the intermediate frequency power to be collected therefrom, fall within the scope of the invention.

In both Figs. 4 and 5, owing to the non-linear properties of the tube, frequencies produced by the sum and by the difference of the frequencies of 21 and 22 are formed inside the tube. It can therefore be seen by examining Fig. 6, that if $f_{s1}$ is the frequency of the signal and $f_{0s}$ that of the local oscillator, waves of the following frequencies are obtained inside the retardation line:

$$f_{s3}=f_{s1}+f_{0s}$$
$$f_{s2}=\pm(f_{s1}-f_{0s})$$

(+ or − according to whether $f_{s1}>f_{0s}$ or $f_{s1}<f_{0s}$)

One of the frequencies, $f_{s2}$, is used as the carrier of the output frequency signal; it is fairly close to the frequency $f_{s1}$. If the tube has been suitably constructed for the frequency $f_{s1}$, the frequency $f_{s2}$ will have a sufficiently intense electric vector for the power at the output frequency to be transferred to a guide (or a line) 28 which is adapted to be tuned by means of the piston 29 and is coupled to the field of the retardation line, inside the tube, as shown in Fig. 4.

What I claim is:

1. A radio relaying system for ultra-short waves adapted to operate as a frequency changer which comprises a travelling wave tube including, in a vacuum-tight envelope, a delay line having an input end and an output end, means near the input end for directing an electron beam along a trajectory parallel to the axis of the line, and means near the output end for collecting the electron beam, means located near the beginning of the trajectory of the beam for modulating the beam of the tube with an incoming frequency, means located near the beginning of the trajectory of the beam and electrically insulated from the delay line for modulating the electron beam with a frequency of a local oscillator which is low as compared to the incoming frequency, whereby the output frequency obtained by mixing the local and incoming frequencies is of the same order of magnitude as the incoming frequency, and means near the output end for selecting and collecting the output frequency.

2. A radio relaying system for ultra-short waves adapted to operate as a frequency changer which comprises a travelling wave tube including, in a vacuum-tight envelope, a delay line having an input end and an output end, means near the input end for directing an electron beam along a trajectory parallel to the axis of the line, and means near the output end for collecting the electron beam, means located near the beginning of the trajectory of the beam for modulating the beam of the tube with an incoming frequency, means located near the beginning of the trajectory of the beam and electrically insulated from the delay line for modulating the electron beam with a frequency of a local oscillator which is low as compared to the incoming frequency, whereby the output frequency obtained by mixing the local and incoming frequencies is of the same order of magnitude as the incoming frequency, and means near the output end for collecting the output frequency so dimensioned as to reject the incoming frequency and the modulation thereof passing through the tube.

3. A system according to claim 1 wherein said means for modulating the electron beam with an incoming frequency comprise a guide for ultra-short waves separated from said electrically insulated means and means for feeding into said guide the signals obtained from the source of the incoming frequency.

4. A system according to claim 1 wherein said electrically insulated means comprise a grid which is electrically separate from said delay line and which is adapted to density modulate the electron beam.

5. A system according to claim 1 wherein said electrically insulated means comprise an electrode which is electrically separate from said delay line and which is interposed in the path of the electron beam, and means for connecting said electrode to the local oscillator for density modulating the beam with the frequency of said source.

6. A system according to claim 1 wherein said electrically insulated means comprise a pair of grid-like members interposed in the path of the electron beam and electrically separate from said delay line, and means for connecting said members to the local oscillator for velocity modulating the beam with the frequency of said source.

7. A system according to claim 1 wherein said electrically insulated means comprise a cavity resonator interposed in the path of the electron beam, and means for coupling said cavity resonator to the local oscillator for velocity modulating the beam with the frequency of said source.

References Cited in the file of this patent

UNITED STATES PATENTS

| | | |
|---|---|---|
| 1,988,621 | Hansell | Jan. 22, 1935 |
| 2,233,779 | Fritz | Mar. 4, 1941 |
| 2,257,795 | Gray | Oct. 7, 1941 |
| 2,276,247 | Hahn | Mar. 10, 1942 |
| 2,278,658 | Kroger | Apr. 7, 1942 |
| 2,289,756 | Clavier et al. | July 14, 1942 |
| 2,300,052 | Lindenblad | Oct. 27, 1942 |
| 2,409,608 | Anderson | Oct. 22, 1946 |
| 2,414,843 | Varian et al. | Jan. 28, 1947 |
| 2,449,975 | Bishop et al. | Sept. 28, 1948 |
| 2,456,466 | Sunstein | Dec. 14, 1948 |
| 2,521,760 | Starr | Sept. 12, 1950 |
| 2,603,772 | Field | July 15, 1952 |